T. G. & J. C. WILSON.
Thrashing Machine.

No. 17,062.

Patented April 14, 1857.

UNITED STATES PATENT OFFICE.

J. C. WILSON AND T. G. WILSON, OF CEDAR HILL, TEXAS.

MACHINE FOR THRESHING GRAIN IN THE FIELD.

Specification of Letters Patent No. 17,062, dated April 14, 1857.

*To all whom it may concern:*

Be it known that we, J. C. WILSON and T. G. WILSON, of Cedar Hill, in the county of Dallas and State of Texas, have invented a new and useful Improvement in Machines for Threshing Grain in the Field; and we do hereby declare that the following is a full, clear, and exact description of the construction and operation of the same, reference being had to the annexed drawing, forming part of this specification, in which—

Figure 1:
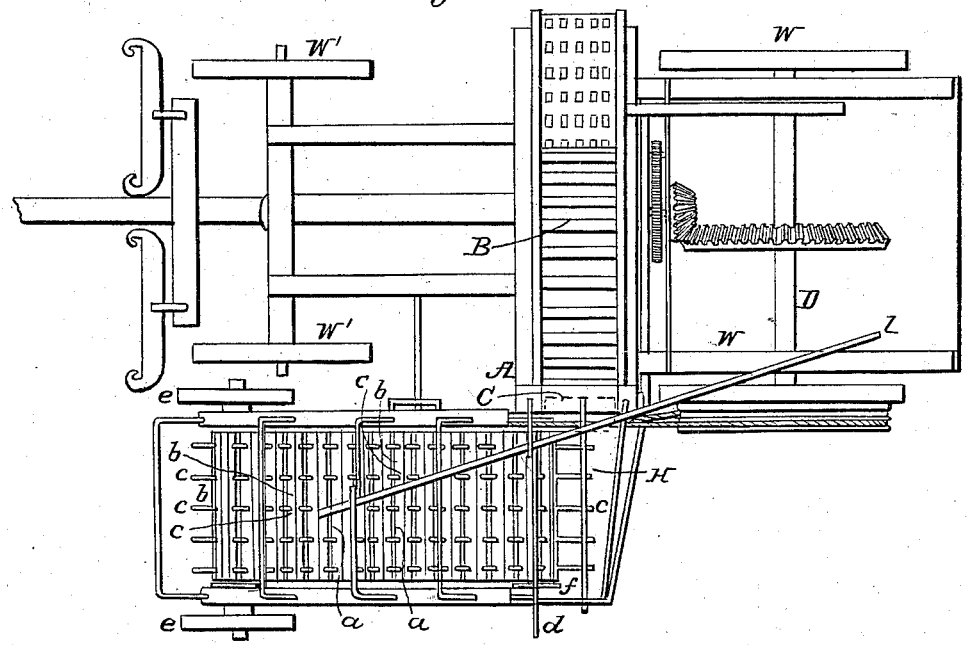
Figure 2:
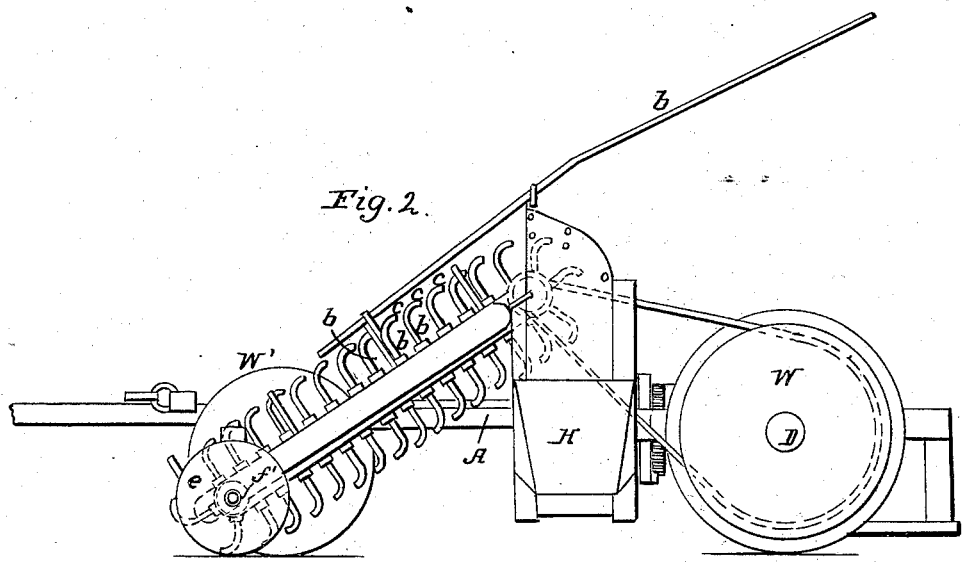

Figure 1 is a plan view of our machine. Fig. 2 is a side view of same.

Similar characters of reference in the several figures denote the same part.

Our invention refers to the collecting of grain from the swath and the delivery of the same to the threshing mechanism driven by the forward movement of the machine. It consists in connecting with the frame of the machine an inclined endless apron armed with hooked teeth arranged in rows; said conveyer moving with the machine and driven by connection with the driving wheels; so that the teeth shall lift the grain from the ground and deliver it to the hopper leading to the threshing cylinder.

In the drawing A is the main frame of the machine carried by wheels W W'. Upon this frame is a threshing cylinder C with its concave, and a separating arrangement of ordinary construction, shown in the drawing at B: the whole driven by gearing connection with the rear driving shaft D. There being no particular novelty in the construction of this portion of the machine it need not be more definitely described.

The cylinder and concave by which the threshing is effected are fed by the inclined hopper H, under the head of the gathering and delivering arrangement. This consists of an endless apron $a$, across which are slats $b$ armed with hooked teeth $c$, arranged in rows. This conveyer is hung upon a shaft $d$, and inclines forward, where the frame is supported on wheels $e$. The apron moves upon the rollers $f$ $f'$, the former of which is driven by band connection with the main driving wheel W. The elevator can be turned about the shaft $d$, by a lever $l$, so as to carry the teeth over an obstruction.

The grain is to be cut either by machinery or the scythe, and is to lie in swaths, so that the straw shall be across the path of the machine. The machine is to be driven so that the gatherer will sweep the swath; the hooked teeth catching the straw and transporting it upward to the head of the conveyer, when it is delivered to hopper H, and passes to the threshing mechanism.

We make no claim to the threshing and cleaning mechanism. Nor do we claim endless conveyers as such. But What we do claim as new and of our own invention and desire to secure by Letters Patent, is—

The arrangement with a traveling thresher as described, of an endless gatherer and conveyer armed with hooked teeth in rows, conforming to the surface passed over, and operated as specified to lift cut grain from the swath and deliver it to the threshing mechanism; the relative portions of the several parts being as set forth.

In testimony whereof, we have hereunto signed our names before two subscribing witnesses.

J. C. WILSON.
T. G. WILSON.

Witnesses:
GEO. PATTEN,
JOHN S. HOLLINGSHEAD.